(12) United States Patent
Morgan (10) Patent No.: US 6,843,447 B2
(45) Date of Patent: Jan. 18, 2005

(54) VERTICAL TAKE-OFF AND LANDING AIRCRAFT

(76) Inventor: Brian H. Morgan, 650 N. 7th St., Oostburg, WI (US) 53070

( * ) Notice: Subject to any disclaimer, the term of this patent is extended or adjusted under 35 U.S.C. 154(b) by 0 days.

(21) Appl. No.: 10/746,082

(22) Filed: Dec. 26, 2003

(65) Prior Publication Data

US 2004/0245374 A1 Dec. 9, 2004

Related U.S. Application Data

(60) Provisional application No. 60/438,429, filed on Jan. 6, 2003.

(51) Int. Cl.[7] .............................................. B64C 15/02
(52) U.S. Cl. .................. 244/12.3; 244/12.4; 244/17.23; 244/23 A; 244/23 B
(58) Field of Search ........................ 244/6, 12.3, 12.4, 244/17.23, 17.25, 23 A, 23 B (56) References Cited

U.S. PATENT DOCUMENTS

| | | | | |
|---|---|---|---|---|
| 3,120,362 A | * | 2/1964 | Curtis et al. .................. 244/52 |
| 3,388,878 A | * | 6/1968 | Peterson et al. .......... 244/23 B |
| 5,244,167 A | * | 9/1993 | Turk et al. .................. 244/12.1 |
| 5,890,441 A | * | 4/1999 | Swinson et al. ........... 244/12.3 |
| 6,561,456 B1 | * | 5/2003 | Devine ...................... 244/12.1 |
| 6,732,972 B2 | * | 5/2004 | Malvestuto, Jr. .......... 244/12.3 |

OTHER PUBLICATIONS

Skyrider 10th Scale Prototype, (2) Pages of (5) Photos.

* cited by examiner

*Primary Examiner*—J. Woodrow Eldred
(74) *Attorney, Agent, or Firm*—Donald J. Ersler (57) ABSTRACT

A vertical take-off and landing aircraft includes a fuselage, a left wing, a right wing, at least one forward thruster, a horizontal stabilizer and a vertical stabilizer. The left and right wings extend from substantially a middle of the fuselage on left and right sides, respectively. The at least one forward thruster is preferably mounted to the fuselage, substantially behind the left and right wings. The horizontal stabilizer extends from a rear of the fuselage. The vertical stabilizer extends from a top of the fuselage at a rear thereof. At least two left lift rotors are retained in the left wing and at least two right lift rotors are retained in the right wing. A second embodiment of the VTOL aircraft includes a fuselage truncated behind the left and right wings with a twin tail empennage.

23 Claims, 7 Drawing Sheets

VERTICAL TAKE-OFF AND LANDING AIRCRAFT

CROSS-REFERENCES TO RELATED APPLICATIONS

This is a utility patent application taking priority from provisional application No. 60/438,429 filed on Jan. 6, 2003.

BACKGROUND OF THE INVENTION

1. Field of the Invention

The present invention relates generally to aircraft and more specifically to a vertical take-off and landing aircraft, which includes improved stability in hover flight over that of a helicopter.

2. Discussion of the Prior Art

The prior art provides several different types of vertical take-off and landing (VTOL) aircraft. One common VTOL method is that of a tilt-rotor design, where typically two larger propellers are mounted to the ends of an abbreviated wing that is designed to tilt the rotors from a vertical position to a horizontal position for normal flight. A drawback to this design is that there is an inherent "danger zone" of time, while the lift of the aircraft is reduced as its wings/propellers are rotated into the forward flight position. One example of the above challenge is encountered by the U.S. military's "Osprey" aircraft.

Another common VTOL method is known as redirected thrust. Although technically the same in terms of physics, these craft are usually powered by turbofan/jet engines, which produce tremendous amounts of directed thrust, which is then redirected downward for vertical take-off and tilted or redirected rearward to propel the plane into forward flight. The same danger of losing lift is present with the redirected thrust. However, the danger zone is greatly reduced, because of the horsepower to weight ratio. The best example of redirected thrust is the British military's AV8 Harrier fighter jet. The Harrier fighter jet is probably the most successful VTOL aircraft, except for the helicopter. Further, U.S. Pat. No. 5,890,441 to Swinson et al. discloses a horizontal and vertical take-off and landing unmanned aerial vehicle. The invention includes two vertical lift devices equally and longitudinally spaced from the center of gravity of the apparatus.

Accordingly, there is a clearly felt need in the art for a vertical take-off and landing aircraft, which does not have an inherent "danger zone" and provides improved stability in hover flight over that of a helicopter.

SUMMARY OF THE INVENTION

The present invention provides a vertical take-off and landing aircraft, which does not have a "danger zone." The vertical take-off and landing aircraft (VTOL aircraft) includes a fuselage, a left wing, a right wing, at least one forward thruster, a horizontal stabilizer and a vertical stabilizer. The left wing extends from a left side of the fuselage at substantially a middle thereof and the right wing extends from a right side of the fuselage at substantially a middle thereof. The at least one forward thruster is preferably mounted to the fuselage, substantially behind the left and right wings. The horizontal stabilizer includes a left horizontal stabilizer portion and a right horizontal stabilizer portion. The left horizontal stabilizer portion extends from a left side of the fuselage at a rear thereof and the right horizontal stabilizer portion extends from a right side of the fuselage at a rear thereof. The vertical stabilizer extends from a top of the fuselage at a rear thereof.

The left wing includes a lift rotor housing, adjacent the left side of the fuselage and the right wing includes a right rotor housing, adjacent the right side of the fuselage. The left rotor housing contains at two left lift rotors and the right rotor housing contains at two right lift rotors. Each lift rotor has at least four blades that preferably include collective pitch. The angular orientation of the lift blades on each lift rotor is preferably controlled by a central flight computer through autopilot or at least one control stick. The forward flight of the VTOL aircraft is also controlled by the central flight computer. The central flight computer receives input from three gyroscopes. A single gyroscope measures pitch, yaw or roll. Preferably, a nose rotor is located in a nose of the fuselage. A left air brake is disposed at a front of the left horizontal stabilizer portion and a right air brake is disposed at a front of the right horizontal stabilizer portion. A second embodiment of the VTOL aircraft includes a fuselage truncated behind the left and right wings and a twin tail empennage.

Accordingly, it is an object of the present invention to provide a VTOL aircraft, does not have an inherent "danger zone"

Finally, it is another object of the present invention to provide a VTOL aircraft, which has improved hover stability over that of a helicopter.

These and additional objects, advantages, features and benefits of the present invention will become apparent from the following specification.

DETAILED DESCRIPTION OF THE PREFERRED EMBODIMENTS

Figure 1:
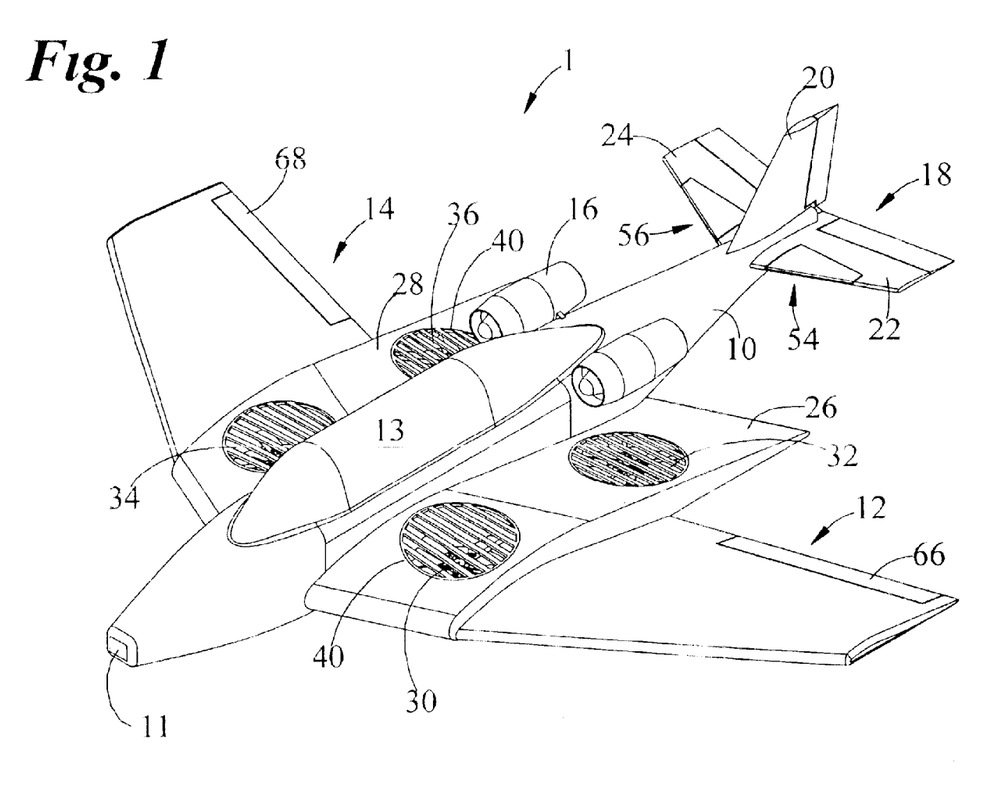
FIG. 1 is a perspective view of a VTOL aircraft in accordance with the present invention.

With reference now to the drawings, and particularly to FIG. 1, there is shown a perspective view of a VTOL aircraft 1. The VTOL aircraft 1 includes a fuselage 10, a left wing 12, a right wing 14, at least one forward thruster 16, a horizontal stabilizer 18 and a vertical stabilizer 20. The left wing 12 extends from a left side of the fuselage 10 at substantially a middle thereof and the right wing 14 extends from a right side of the fuselage 10 at substantially a middle thereof. The at least one forward thruster 16 is preferably mounted to the fuselage 10, substantially behind the left and right wings. The horizontal stabilizer 18 includes a left horizontal stabilizer portion 22 and a right horizontal stabilizer portion 24. The left horizontal stabilizer portion 22 extends from a left side of the fuselage 10 at a rear thereof and the right horizontal stabilizer portion 24 extends from a right side of the fuselage 10 at a rear thereof. The vertical stabilizer 20 extends from a top of the fuselage 10 or the horizontal stabilizer 18 at a rear thereof.

Figure 4:
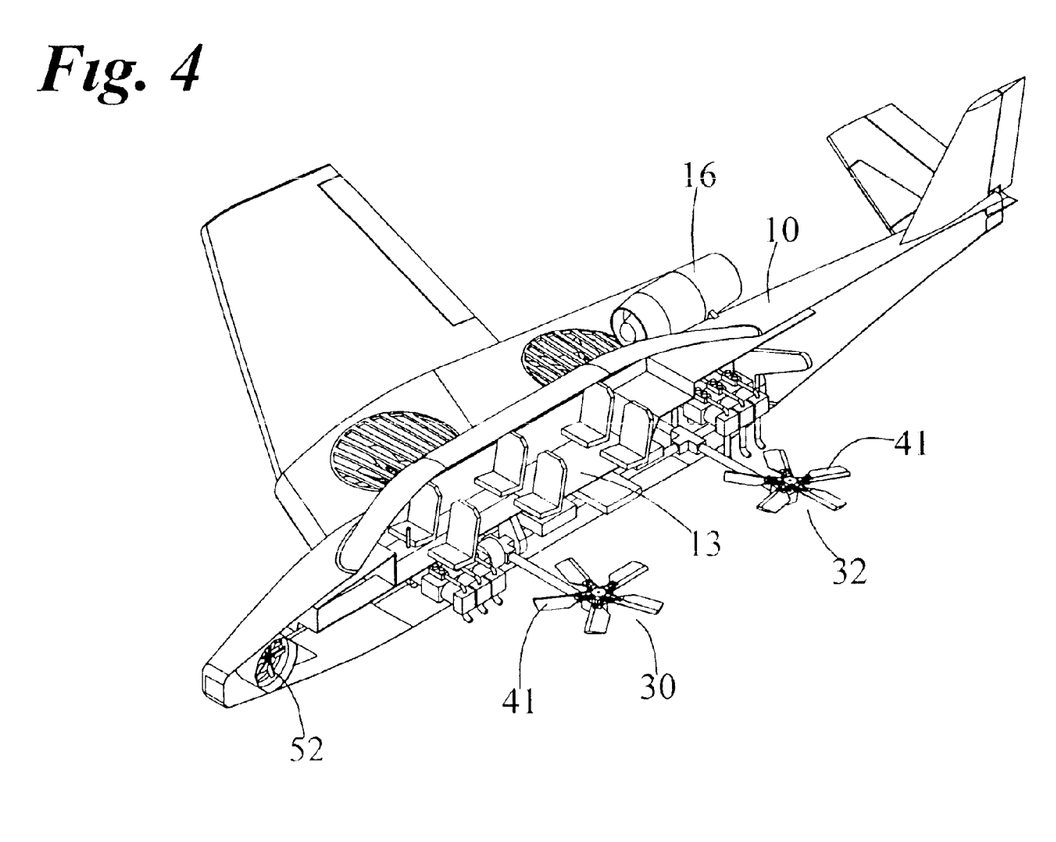
FIG. 4 is a perspective of a VTOL aircraft with a portion of the fuselage cutaway and the left wing removed in accordance with the present invention.

The left wing 12 includes a lift rotor housing 26, adjacent the left side of the fuselage 10 and the right wing 14 includes a right rotor housing 28, adjacent the right side of the fuselage 10. The left rotor housing 26 includes a front left lift rotor 30 and a rear left lift rotor 32. The right rotor housing 28 includes a front right lift rotor 34 and a rear right lift rotor 36. A rotor protector 40 is preferably placed on top of each lift rotor to protect thereof from damage due to objects drawn by each lift rotor and allow support for entering and exiting a cockpit 13. With reference to FIG. 4, each lift rotor has at least four lift blades 41. Each lift rotor preferably includes collective pitch. Collective pitch allows the angular orientation of the at least four lift blades 41 to be changed. The ability to change the angular orientation of each lift rotor allows the VTOL aircraft 1 to hover over uneven terrain. Collective pitch is well known in the art and need not be explained in detail.

Figures 2, 2A, 2B:
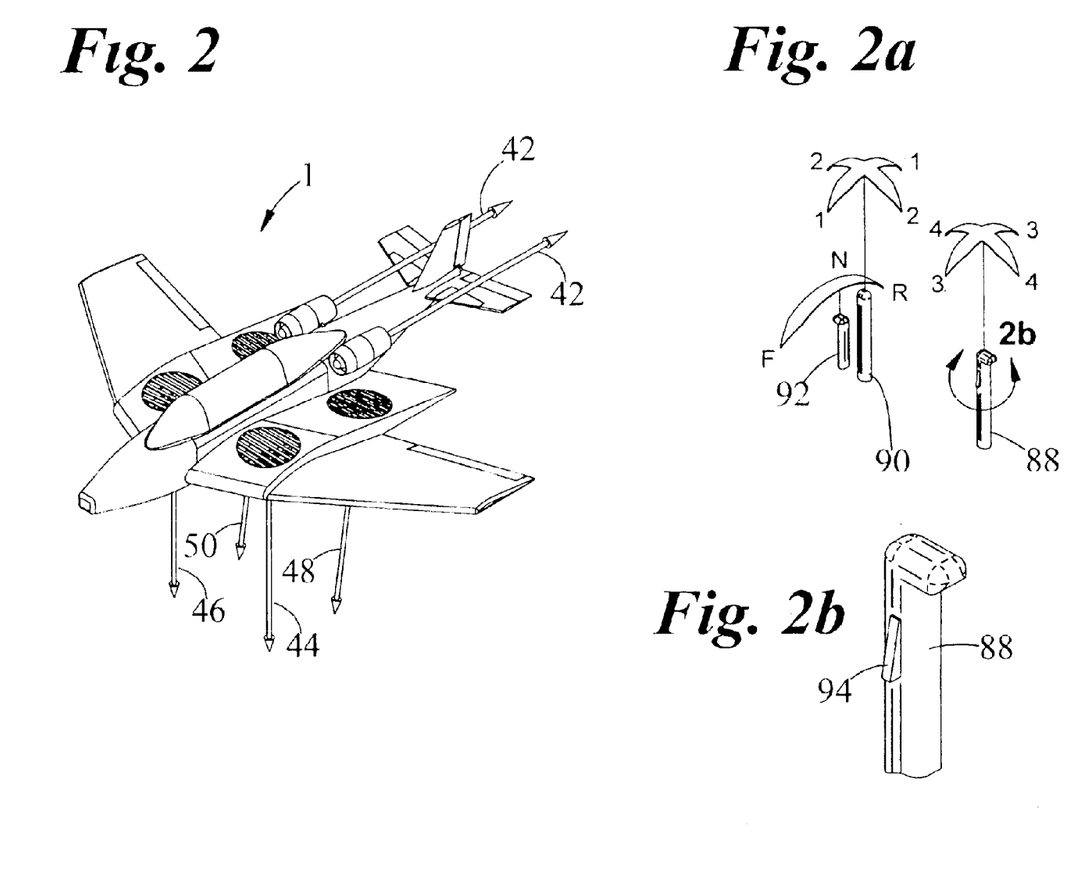
FIG. 2 is a perspective view of a VTOL aircraft, illustrating the thrust path of the lift rotors and a forward thruster in accordance with the present invention.
FIG. 2a is a perspective view of three flight control sticks of a VTOL aircraft in accordance with the present invention.
FIG. 2b is an enlarged perspective view of a hover control stick of a VTOL aircraft in accordance with the present invention.
Figures 5, 5A, 6:
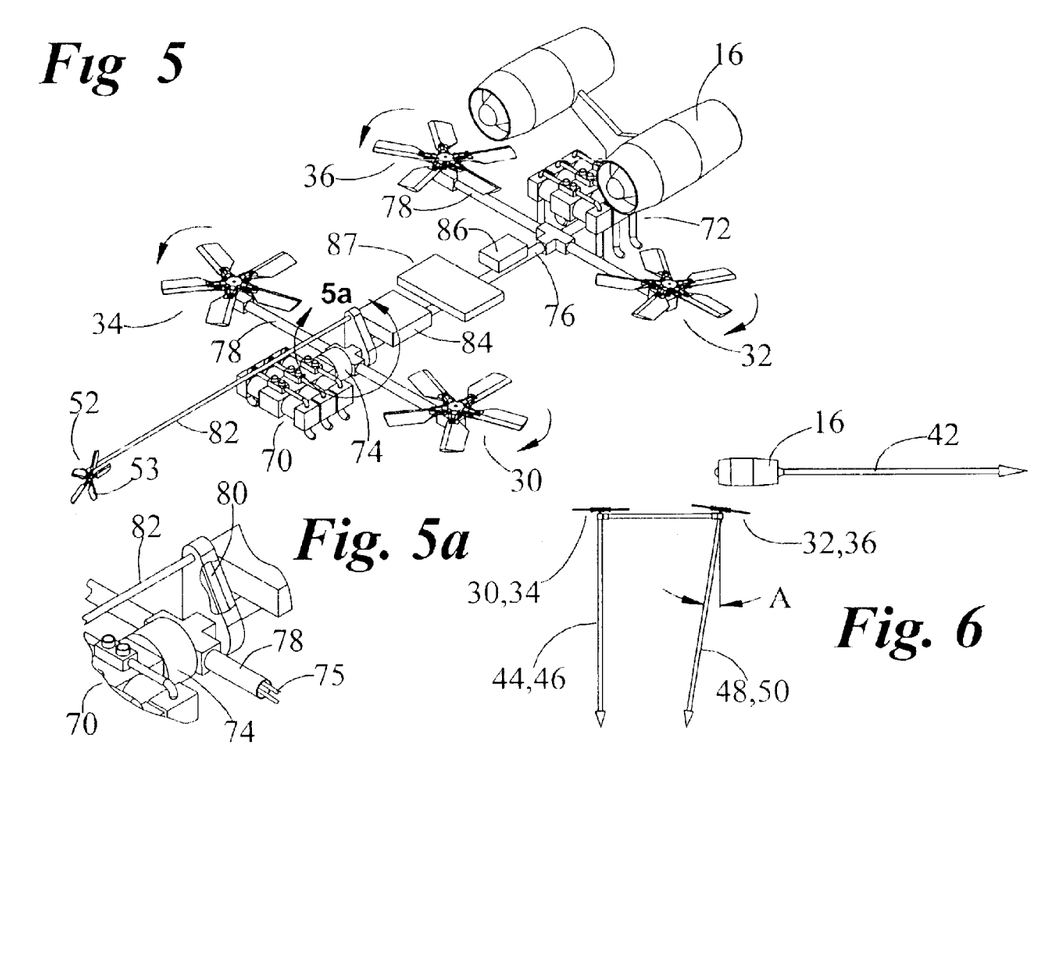
FIG. 5 is a perspective view of a lift rotor drive system and a thrust drive system of a VTOL aircraft in accordance with the present invention.
FIG. 5a is an enlarged perspective view of a nose rotor drive system of a VTOL aircraft in accordance with the present invention.
FIG. 6 is a schematic drawing of the angular orientation of at least two front lift rotors and at least two rear lift rotors of a VTOL aircraft in accordance with the present invention.

The thrust vectors of the at least one forward thruster 16 and the lift rotors are illustrated in FIGS. 2 and 6. A forward thrust vector 42 of each forward thruster 16 points substantially horizontal and to the rear of the fuselage 10. A front left thrust vector 44 of the front left lift rotor 30 points substantially perpendicular to the fuselage 10 and a front right thrust vector 46 of the front right lift rotor 34 points substantially perpendicular to the fuselage 10. A rear left thrust vector 48 of the front left lift rotor 32 points downward at an angle "A" from the yaw axis of the fuselage 10 and a rear right thrust vector 50 of the front left lift rotor 36 points downward at an angle "A" from the yaw axis of the fuselage 10. The value of angle "A" is preferably between 5–15 degrees, but other values may also be used. The angulation of the rear left and right lift rotors offsets the slight forward thrust provided by the at least one forward thruster 16 to prevent the VTOL aircraft 1 from prematurely moving forward during hover flight. The left lift rotors have a directional rotation opposite that of the right lift rotors. The at least one forward thruster 16 is preferably running, even when the VTOL aircraft 1 is hovering over a set location.

Figure 7:
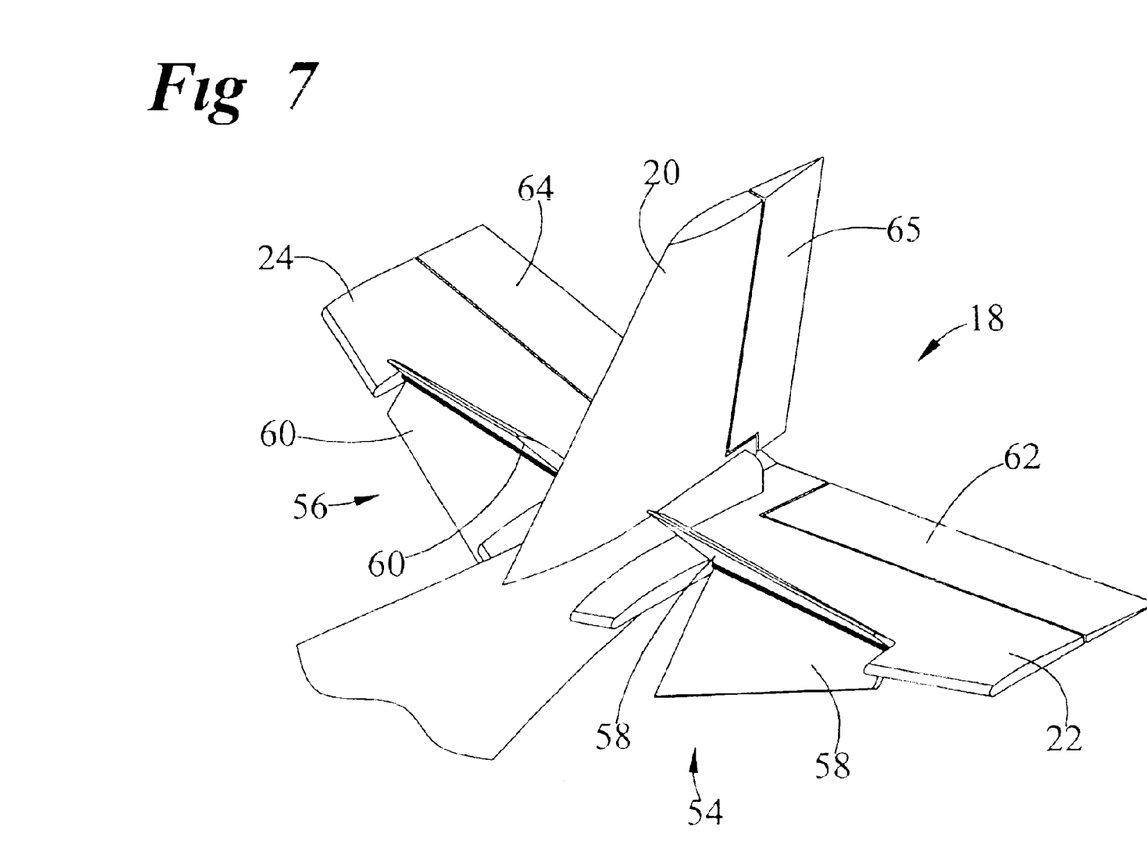
FIG. 7 is an enlarged perspective view of a rear of a fuselage with left and right air brakes in an actuated position of a VTOL aircraft in accordance with the present invention.

Preferably, a nose rotor 52 is located in a nose of the fuselage 10. The nose rotor 52 includes at least four nose blades 53. The at least four nose blades 53 preferably have collective pitch. A left air brake 54 is disposed at a front of the left horizontal stabilizer portion 22 and a right air brake 56 is disposed at a front of the right horizontal stabilizer portion 24. With reference to FIG. 7, the left air brake 54 includes two left brake flaps 58, which spread apart from each other in an open position. The right air brake 56 includes two right brake flaps 60, which spread apart from each other in an open position. The left and right air brakes provide horizontal stopping during forward flight and the ability to move rearward during hover flight.

A left elevator 62 is pivotally retained on a rear of the left horizontal stabilizer portion 22 and a right elevator 64 is pivotally retained on a rear of the right horizontal stabilizer portion 24. A rudder 65 is pivotally retained on a rear of the vertical stabilizer 20. A left aileron 66 is pivotally retained on a rear of the left wing 12 and a right aileron 68 is pivotally retained on a rear of the right wing 12.

A first engine 70 is preferably disposed at substantially a front of the fuselage 10 and a second engine 72 is preferably disposed at substantially a rear of the fuselage 10. With reference to FIG. 5a, the first engine 70 preferably drives the lift rotors through a first clutch 74, a central drive shaft (not shown) and a single rotor drive belt 75 to each lift rotor. The central drive shaft is preferably retained in a central protection tube 76. Each drive belt 75 is preferably retained in a rotor tube 78. The nose rotor 52 is preferably driven by the central drive shaft, a nose drive belt 80, a drive shaft 82 and a set of gears (not shown). If the first engine 70 fails, the first clutch 74 will disengage and a second clutch (not shown) will engage the second engine 72 and the central drive shaft.

The at least one forward thruster 16 may be a propeller, a turbo fan or a jet turbine. If the at least one forward thruster is a propeller or a turbo fan, the second engine 72 is used to drive thereof through an appropriate drive system.

The attitude and movement of the VTOL aircraft 1 is controlled through at least one central flight computer 84 and a gyro sensing unit 86. Preferably, two central flight computers 84 are used. A second central flight computer acts as a redundant backup. The gyro sensing unit 86 includes six gyroscopes. Two gyroscopes are assigned to the roll, pitch or yaw axis. Each second gyroscope acts a redundant backup to the first gyroscope.

With reference to FIG. 2a, the central flight computer 84 will receive input through a hover control stick 88, an attitude control stick 90 and a throttle stick 92. The hover control stick 88 includes a trigger 94. Moving the hover control stick 88 in the 3—3 direction controls the collective pitch of the at least four lift rotors and engine speed of the first engine 70. Pushing the hover control stick 88 forward increases the angular orientation of the at least four lift blades 41 on each lift rotor and increases the engine speed of the first engine with the result of providing increased lift to the VTOL aircraft 1. Pulling the hover control stick 88 rearward decreases the angular orientation of the at least four lift blades 41 on each lift rotor and decreases the engine speed of the first engine with the general result of providing decreased lift to the VTOL aircraft 1.

Moving the hover control stick 88 in the 4—4 direction controls the pivoting of the rudder 65. When the hover control stick 88 is pushed to the right, a nose 11 of the fuselage 10 turns to the right. When the hover control stick 88 is pushed to the left, the nose 11 of the fuselage 10 turns to the left. When the trigger 94 is pulled and the hover control stick 88 is pushed to the right; the angular orientation of the at least four nose blades 53 are changed, such that the VTOL aircraft 1 moves sideways right without affecting roll axis stability. When the trigger 94 is pulled and the hover control stick 88 is pushed to the left; the angular orientation of the at least four nose blades 53 are changed, such that the VTOL aircraft 1 moves sideways left.

Moving the attitude control stick 90 in the 1—1 direction controls the attitude of the VTOL aircraft 1 about the pitch axis. A forward motion of the attitude control stick 90 causes the nose 11 to dive and a back motion of the attitude control stick 90 causes the nose 11 to lift. Moving the attitude control stick 90 in the 2—2 direction controls the attitude of the VTOL aircraft 1 about the roll axis. Moving the attitude control stick 90 to the right causes the right wing 14 to be lower than the left wing 12 and moving the attitude control stick 90 to the left causes the left wing 12 to be lower than the right wing 14.

When the throttle control stick 92 is in the center position (straight-up), the thrust of the second engine 72 is at idle and the left and right air brakes are in a closed position. Moving the throttle control stick 92 forward increases the engine speed of the second engine 72 and/or the thrust of the at least one forward thruster 16. Moving the throttle control stick 92 rearward from the center position approximately 50% of the maximum rearward movement, preferably starts opening the left and right air brake. The left and right air brakes act as a brake by putting a drag on the forward motion of the VTOL aircraft 1. When the throttle control stick 92 is pulled rearward to a maximum position, left and right air brakes will fully open and the engine speed or the forward thrust of the at least one forward thruster 16 will be preferably increased to 60–65% of full power. The result of throttle control stick 92 being at a rearward maximum position is that the thrust of the at least one forward thruster 16 will reflect off the left and right air brakes and move the VTOL aircraft 1 rearward, during hover flight.

Figure 8:
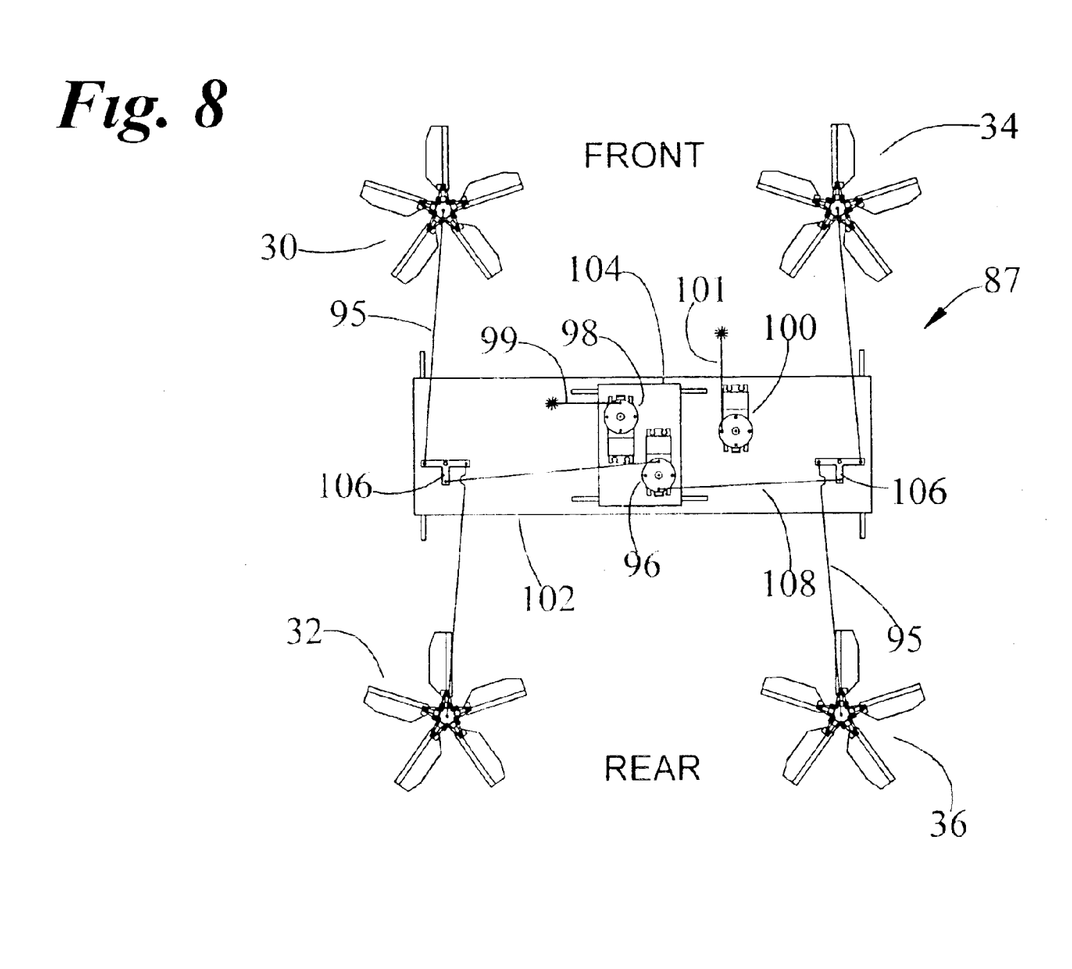
FIG. 8 is a schematic drawing of a hover attitude control system of a VTOL aircraft in accordance with the present invention.

With reference to FIG. 8, a hover attitude control system 87 includes at least four actuation rods 95, a collective pitch servo motor 96, a roll servo motor 98, a pitch servo motor 100, a pitch slide plate 102 and a roll slide plate 104. The collective pitch of the at least four lift rotors are preferably each controlled by at least one actuation rod 95. The collective pitch of the nose rotor 52 is preferably controlled by at least one nose actuation rod (not shown). The movement of the at least four actuation rods 95 are preferably controlled by the collective pitch servo motor 96, the roll servo motor 98 and the pitch servo motor 100. The pitch slide plate 102 is slidably attached to the fuselage 10 and moves from a front to a rear of the fuselage 10. The roll slide plate 104 is attached to a top of the pitch slide plate 102 and moves perpendicular to the sliding motion of the pitch slide plate 102. The collective pitch servo motor 96 actuates a pair of pivot plates 106 through a pair of push rods 108. The pivot plates 106 control the collective pitch of the at least four lift rotors through at least four actuation rods 95.

The VTOL aircraft 1 is pivoted along the pitch axis by moving the pitch slide plate 102 with the pitch servo motor 100, through an actuation rod 101. The pitch servo motor 100 decreases or increases the collective pitch of the front rotors relative to the rear rotors. The VTOL aircraft 1 is pivoted along the roll axis by moving the roll slide plate 104 with the roll servo motor 98, through an actuation rod 99. The roll servo motor 98 decreases or increases the collective pitch of the left side rotors relative to the right side rotors. The collective pitch of the at least four nose blades 53 are preferably controlled through a nose servo motor and the at least one nose actuation rod (neither shown).

The movement of the servo motors are controlled by the at least one central flight computer 84. The at least one central flight computer 84 operates the servo motors by instruction from the control sticks or by instruction from autopilot.

Figure 3:
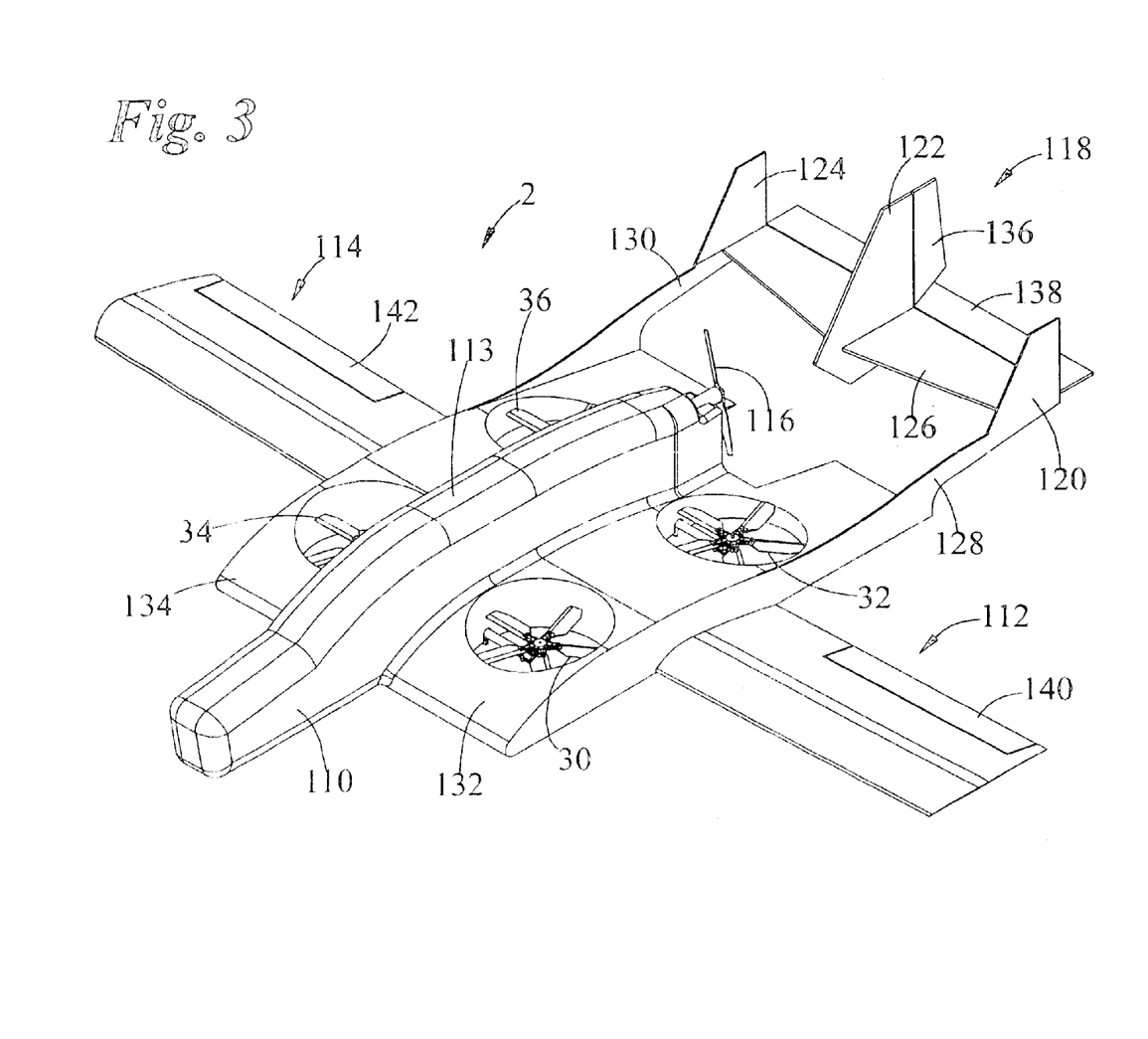
FIG. 3 is a perspective view of a second embodiment of a VTOL aircraft in accordance with the present invention.

With reference to FIG. 3, a second embodiment of the VTOL aircraft 2 includes a fuselage 110, a left wing 112, a right wing 114, at least one forward thruster 116, and a twin tail empennage 118. The left wing 112 extends from a left side of the fuselage 110 at substantially a middle thereof and the right wing 114 extends from a right side of the fuselage 110 at substantially a middle thereof. The at least one forward thruster 116 is preferably mounted to a rear of the fuselage 110. The left wing 112 includes a left rotor housing 132, adjacent the left side of the fuselage 110 and the right wing 114 includes a right rotor housing 134, adjacent the right side of the fuselage 110. The twin tail empennage 118 includes a left auxiliary vertical stabilizer 120, a vertical stabilizer 122, a right auxiliary vertical stabilizer 124, a horizontal stabilizer 126, a left tail boom support 128 and a right tail boom support 130.

The left tail boom support 128 extends rearward from the left rotor housing 132 and the right tail boom support 130 extends rearward from the right rotor housing 134. The left vertical stabilizer 120 extends upward from a rear of the left tail boom support 128 and the right vertical stabilizer 124 extends upward from a rear of the right tail boom support 130. The horizontal stabilizer 126 is retained between the left and right tail boom supports. The center vertical stabilizer 122 extends upward from a middle of the horizontal stabilizer 126. A rudder 136 is pivotally retained on a rear of the vertical stabilizer 122. An elevator 138 is pivotally retained on a rear of the horizontal stabilizer 126.

The left rotor housing 132 includes the front left lift rotor 30 and a rear left lift rotor 32. The right rotor housing 134 includes a front right lift rotor 34 and a rear right lift rotor 36. The rotor protector 40 (not shown) is preferably placed on top of each lift rotor to protect thereof from damage due to objects drawn by each lift rotor and allow support for entering and exiting a cockpit 113. The at least four lift rotors preferably operate the same way as in FIG. 5. The thrust vectors are the same as illustrated in FIGS. 2 and 6. The nose rotor 52, and the left and right air brakes are not shown in FIG. 3, but may be included, if desired. A left aileron 140 is pivotally retained on a rear of the left wing 112 and a right aileron 142 is pivotally retained on a rear of the right wing 114.

The first engine 70 (not shown) is used to rotate the at least four lift rotors through the same elements as in the VTOL aircraft 1. If the first engine 70 fails, the second engine (not shown) will drive the at least four lift rotors. The at least one forward thruster 116 may be a propeller, a turbo fan or a jet turbine. If the at least one forward thruster is a propeller or a turbo fan, the second engine 72 is used to drive thereof through an appropriate drive system. The attitude and movement of the VTOL aircraft 2 is controlled the same way as in the VTOL aircraft 1. The VTOL aircraft 2 includes the same control sticks as in the VTOL aircraft 1. However, the hover control stick 88 does not include the trigger 94, unless a nose rotor 52 is installed.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of providing a vertical take-off and landing aircraft, comprising the steps of:

provdiing a fuselage;

extending a left wing from a left side of said fuselage and extending a right wing from a right side of said fuselage;

retaining a first left lift rotor in said left wing, retaining at least one second left lift rotor in said left wing behind said first left lift rotor;

retaining a first right lift rotor in said right wing, retaining at least one second right lift rotor in said right wing behind said first right lift rotor; and providing at least one forward thruster.

2. The method of providing a vertical take-off and landing aircraft of claim 1, further comprising the step of:

retaining a horizontal stabilizer at a rear of said aircraft.

3. The method of providing a vertical take-off and landing aircraft of claim 2, further comprising the step of:

extending a vertical stabilizer from said horizontal stabilizer.

4. The method of providing a vertical take-off and landing aircraft of claim 1, further comprising the step of:

rotating at least one of said at least two left lift rotors in a direction opposite that of at least one of said at least two right lift rotors.

5. The method of providing a vertical take-off and landing aircraft of claim 1, further comprising the step of:

retaining a nose rotor in a nose of said fuselage.

6. The method of providing a vertical take-off and landing aircraft of claim 1, further comprising the steps of:

retaining a left air brake on a left front of said horizontal stabilizer; and retaining a right air brake on a right front of said horizontal stabilizer.

7. The method of providing a vertical take-off and landing aircraft of claim 1, further comprising the step of:

providing said at least two left lift rotors and said at least two right lift rotors with collective pitch.

8. The method of providing a vertical take-off and landing aircraft of claim 1, further comprising the step of:

tilting one of said at least one second left lift rotors to provide some rearward thrust, tilting one of said at least one second right lift rotors to provide some rearward thrust.

9. The method of providing a vertical take-off and landing aircraft of claim 1, further comprising the step of:

controlling the attitude of said aircraft while hovering with a central flight computer.

10. A method of providing a vertical take-off and landing aircraft, comprising the steps of:

providing a fuselage;

extending a left wing from a left side of said fuselage and extending a right wing from a right side of said fuselage;

retaining a first left lift rotor in said left wing, retaining at least one second left lift rotor in said left wind behind said first left lift rotor;

retaining a first right lift rotor in said right wing, retaining at least one second right lift rotor in said right wing behind said first right lift rotor, providing said at least two left lift rotors and said at least two right lift rotors with collective pitch; and providing at least one forward thruster.

11. The method of providing a vertical take-off and landing aircraft of claim 10, further comprising the step of:

retaining a horizontal stabilizer at a rear of said aircraft.

12. The method of providing a vertical take-off and landing aircraft of claim 11, further comprising the step of;

extending a vertical stabilizer from said horizontal stabilizer.

13. The method of providing a vertical take-off and landing aircraft of claim 10, further comprising the step of:

rotating at least one of said at least two left lift rotors in a direction opposite that of at least one of said at least two right lift rotors.

14. The method of providing a vertical take-off and landing aircraft of claim 10, further comprising the step of:

retaining a nose rotor in a nose of said fuselage.

15. The method of providing a vertical take-off and landing aircraft of claim 10, further comprising the steps of:

retaining a left air brake on a left front of said horizontal stabilizer; and retaining a right air brake on a right front of said horizontal stabilizer.

16. The method of providing a vertical take-off and landing aircraft of claim 10, further comprising the step of:

tilting one of said at least one second left lift rotors to provide some rearward thrust, tilting one of said at least one second right lift rotors to provide some rearward thrust.

17. The method of providing a vertical take-off and landing aircraft of claim 10, further comprising the step of:

controlling the attitude of said aircraft while hovering with a central flight computer.

18. A method of providing a vertical take-off and landing aircraft, comprising the steps of:

providing a fuselage;

extending a left wing from a left side of said fuselage and extending a right wing from a right side of said fuselage;

retaining at least two left lift rotors adjacent a left side of said fuselage, retaining at least two right lift rotors adjacent to a right side of said fuselage;

retaining a first left lift rotor in said left wing, retaining at least one second left lift rotor in said left wing behind said first left lift rotor;

retaining a first right lift rotor in said right wing, retaining at least one second right lift rotor in said right wing behind said first right lift rotor; and terminating a rear of said aircraft with a twin tail empennage; and retaining at least one forward thruster at a rear of said fuselage.

19. The method of providing a vertical take-off and landing aircraft of claim 18, further comprising the step of:

said twin tail empennage including a horizontal stabilizer and a vertical stabilizer from said horizontal stabilizer.

20. The method of providing a vertical take-off and landing aircraft of claim 18, further comprising the step of:

rotating at least one of said at least two left lift rotors in a direction opposite that of at least one of said at least two right lift rotors.

21. The method of providing a vertical take-off and landing aircraft of claim 18, further comprising the step of:

providing said at least two left lift rotors and said at least two right lift rotors with collective pitch.

22. The method of providing a vertical take-off and landing aircraft of claim 18, further comprising the step of:

tilting one of said at least one second left lift rotors to provide some rearward thrust, tilting one of said at least one second right lift rotors to provide some rearward thrust.

23. The method of providing a vertical take-off and landing aircraft of claim 18, further comprising the step of:

controlling the attitude of said aircraft while hovering with a central flight computer.

* * * * *